(12) United States Patent
Kennedy

(10) Patent No.: US 11,378,302 B2
(45) Date of Patent: Jul. 5, 2022

(54) FLOOR VENT ASSEMBLY

(71) Applicant: PERFECT VENTS, INC., Troy, MI (US)

(72) Inventor: Joseph Kennedy, Swartz Creek, MI (US)

(73) Assignee: PERFECT VENTS, INC., Troy, MI (US)

( * ) Notice: Subject to any disclaimer, the term of this patent is extended or adjusted under 35 U.S.C. 154(b) by 96 days.

(21) Appl. No.: 16/836,327

(22) Filed: Mar. 31, 2020

(65) Prior Publication Data
US 2020/0224920 A1 Jul. 16, 2020

Related U.S. Application Data

(63) Continuation of application No. 15/833,067, filed on Dec. 6, 2017, now Pat. No. 10,641,518.

(51) Int. Cl.
*F24F 13/068* (2006.01)
*B23P 19/04* (2006.01)
*F24F 13/08* (2006.01)

(52) U.S. Cl.
CPC .......... *F24F 13/068* (2013.01); *B23P 19/04* (2013.01); *F24F 13/084* (2013.01); *F24F 2221/40* (2013.01)

(58) Field of Classification Search
CPC .... F24F 13/068; F24F 13/084; F24F 2221/40; B23P 19/04

USPC ........................................................ 454/289
See application file for complete search history.

(56) References Cited

U.S. PATENT DOCUMENTS

| | | | |
|---|---|---|---|
| 2,786,407 A | 3/1957 | Sarles | |
| 3,564,770 A | 2/1971 | Korbelic | |
| 6,019,677 A * | 2/2000 | Demster | F24F 13/068 454/290 |
| 6,234,894 B1 | 5/2001 | Goracke | |
| 7,819,730 B2 | 10/2010 | Ascroft | |
| 9,777,475 B1 | 10/2017 | Yasinskiy | |
| 2003/0220070 A1 | 11/2003 | Orendorff | |
| 2013/0072104 A1 | 3/2013 | Picco | |
| 2014/0161673 A1 | 6/2014 | Hammer | |

* cited by examiner

*Primary Examiner* — Allen R. B. Schult
(74) *Attorney, Agent, or Firm* — Haley Guiliano LLP; Stefan D. Osterbur

(57) ABSTRACT

A vent cover assembly is disclosed, such as for a floating or fixed floor. Example vent cover assemblies may include a support plate configured to be secured over a duct, and a flush mount vent cover. The support plate may define a plurality of first airflow apertures configured to permit airflow from the duct through the support plate. The vent cover may define a second plurality of airflow apertures that are positioned in the vent cover such that the second plurality of airflow apertures are aligned with the first airflow apertures when the vent cover is in a first installed position overlying the support plate. The vent cover may obstruct the first airflow apertures when the vent cover is in a second installed position overlying the support plate.

22 Claims, 7 Drawing Sheets

FLOOR VENT ASSEMBLY

CROSS REFERENCE TO RELATED APPLICATION

This application is a continuation of U.S. patent application Ser. No. 15/833,067 filed on Dec. 6, 2017, the contents of which are hereby expressly incorporated by reference in their entirety.

BACKGROUND

Floor vents generally allow for the passage of air from heating/ventilation/air conditioning (HVAC) systems into a room. Floor vents typically have covers that are installed such that they protrude above the surrounding floor surface. In addition to their general lack of aesthetic appeal resulting from the discontinuity in floor surface and/or materials, the protrusion of conventional floor vent covers can create a tripping hazard or interfere with the placement of furniture. While some vents have been developed more recently that have a lower profile, they typically employ fixed openings that do not allow for adjustment of a flow rate of air through the vent or for the vent to be closed.

Accordingly, there is a need for an improved floor vent that addressed the above shortcomings.

BRIEF DESCRIPTION OF THE DRAWINGS

Referring now to the drawings, exemplary illustrations are shown in detail. Although the drawings represent some examples, the drawings are not necessarily to scale and certain features may be exaggerated, removed, or partially sectioned to better illustrate and explain the present invention. Further, the exemplary illustrations set forth herein are not intended to be exhaustive or otherwise limit or restrict the claims to the precise forms and configurations shown in the drawings and disclosed in the following detailed description:

DETAILED DESCRIPTION

Figure 1A:
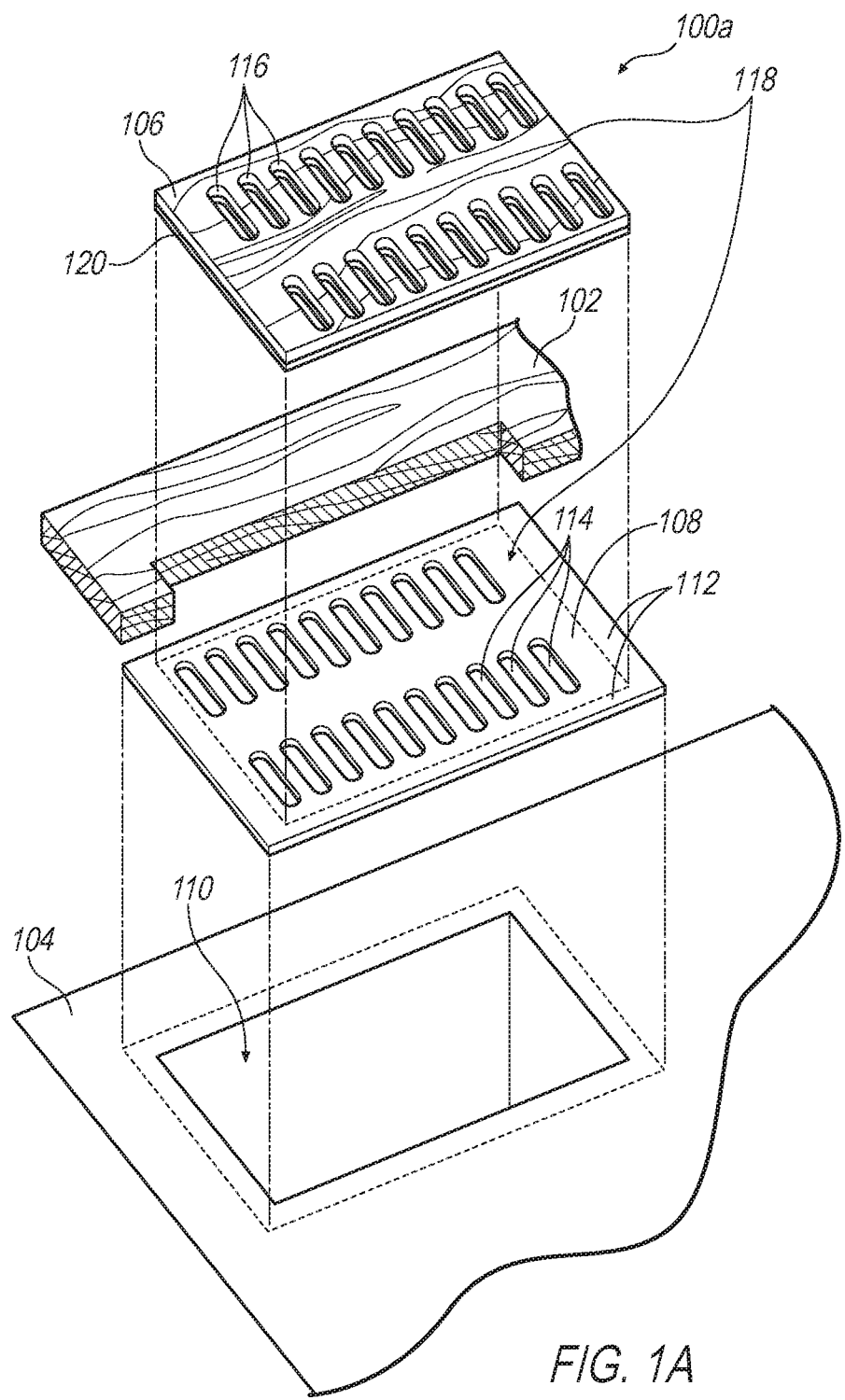
FIG. 1A is an exploded perspective view of a floor vent assembly with a vent cover in an open orientation, according to one example.

Exemplary illustrations are disclosed below in regard to a vent cover assembly and associated methods, such as for installing a vent cover assembly. Generally, a vent cover assembly may be installed flush with the surrounding area, i.e., the surrounding floor surface, such that it does not protrude outward from the surface of the flooring, or noticeably so. Moreover, there is generally no restriction on what materials the vent cover can formed of. In some examples, the vent cover is formed from the same material as the flooring, so as to blend in with the flooring. While the various examples herein are directed to floor vents located within floors, example illustrations may also be adapted for use in other surfaces, e.g., wall surfaces or ceilings.

Example vent cover assemblies may also permit opening and closing of the vent, thereby permitting selective adjustment to a flow of heated/cooled air into a room. In at least some examples, a floor vent assembly includes a support plate and a vent cover that each define respective airflow openings. More specifically, the support plate may be configured to be secured over a duct, and define a plurality of first airflow apertures through which air may flow from the duct. A flush mount vent cover may have an upper surface configured to extend substantially continuous with an adjacent floor surface when installed overlying the support plate, thereby providing a substantially flush floor surface. The vent cover defines a second plurality of airflow apertures that are positioned in the vent cover such that they are aligned with the first airflow apertures when the vent cover is in a first installed position overlying the support plate, thereby allowing air to flow from the duct and into the room. In a second installed position overlying the support plate, the vent cover obstructs the first airflow apertures, thereby restricting or cutting off entirely the flow of air from the duct into the room. The vent cover may be selectively repositioned between the first and second installed positions, thereby allowing selective opening/closing of the vent cover assembly.

In some examples, a vent cover assembly may be used in connection with a floating floor, i.e., a floor that is laid over a subfloor without being nailed, glued, bonded, or otherwise permanently affixed directly to the subfloor. In such floating floor installations, the support plate may generally be enlarged with respect to an opening in the floor surface through which a heating/ventilation/air conditioning (HVAC) duct forces air. For example, an outer perimeter of the support plate may be sandwiched between an underside of the flooring and the subfloor (which is disposed beneath the flooring). The vent cover may be relatively smaller than the support plate in these cases, fitting into an opening defined by the floor surface.

In other examples, a vent cover assembly may be installed into a fixed flooring system, i.e., where the flooring is secured to a subfloor by way of nails, glue, bonding, or the like. In these examples, an outer frame may be provided which at least partially surrounds the support plate. The outer frame may be secured to a subfloor, within an aperture in the flooring provided for an HVAC duct. The outer frame, by being secured to the subfloor, generally maintains a fixed space for the support plate in the flooring system, and permits the support plate to be selectively removeable from the outer frame.

As generally noted above, example vent covers may include openings or apertures that are selectively aligned with corresponding openings or apertures in the support plate, thereby permitting opening/closing of the vent assembly. In some examples, the openings of the vent cover may be asymmetrically aligned with an outer perimeter of the vent cover. The vent cover may be installed overlying the support plate in two distinct positions relative to the support plate. More specifically, in a first position, the openings of the vent cover will generally line up with the openings of the support plate, thereby freely allowing the passage of air from the duct to pass through the vent cover assembly. The vent cover may then be lifted out of the assembly, rotated 180 degrees, and reinstalled overlying the support plate in a second position. In the second position, the openings of the vent cover are shifted laterally with respect to those of the support plate as a result of the asymmetric arrangement of the apertures in the vent cover. Accordingly, airflow through the vent cover assembly from the duct is inhibited or blocked entirely.

Figure 1B:
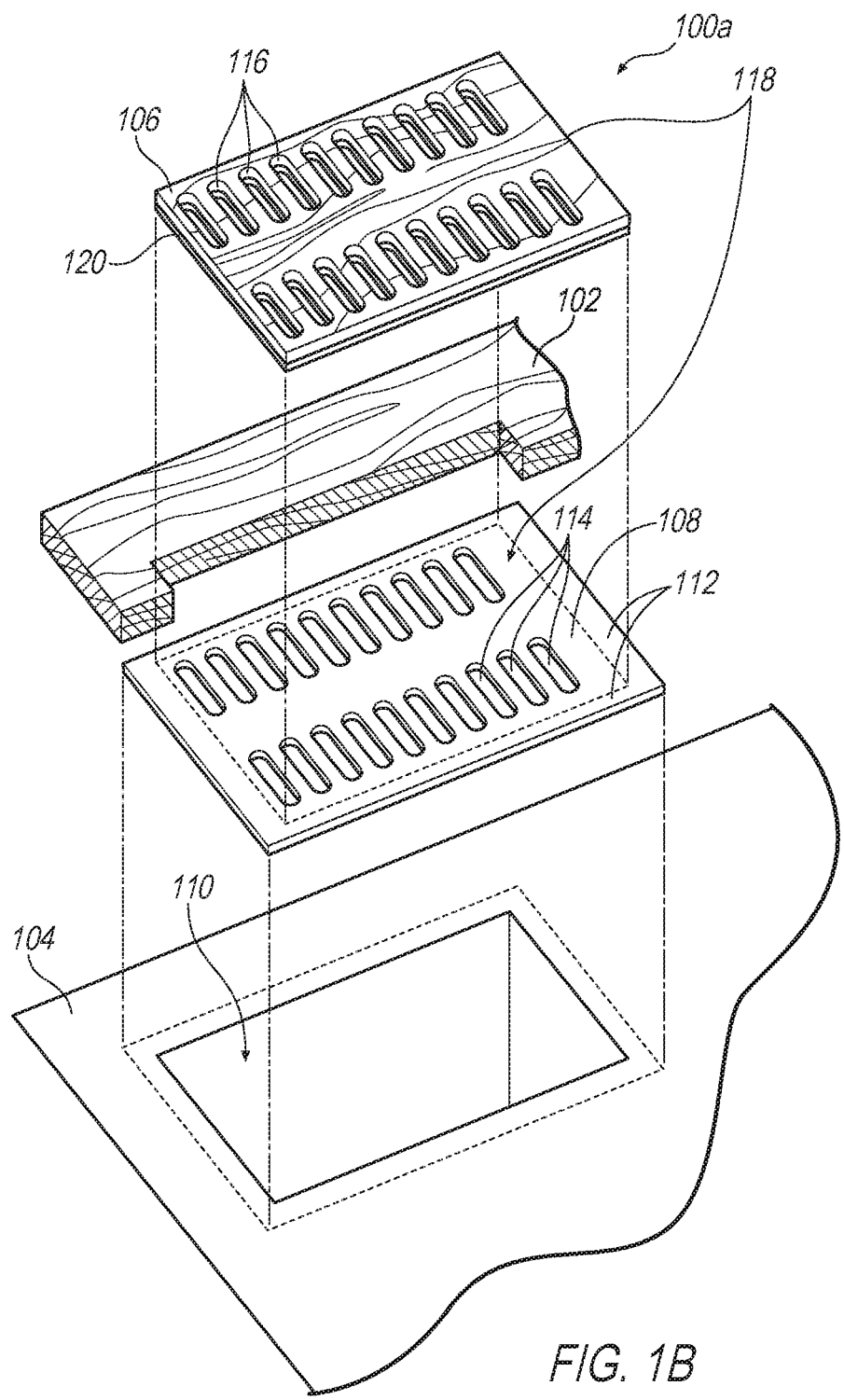
FIG. 1B is an exploded perspective view of the floor vent assembly of FIG. 1A with the vent cover in a closed or obstructed orientation, according to an example approach.
Figure 2:
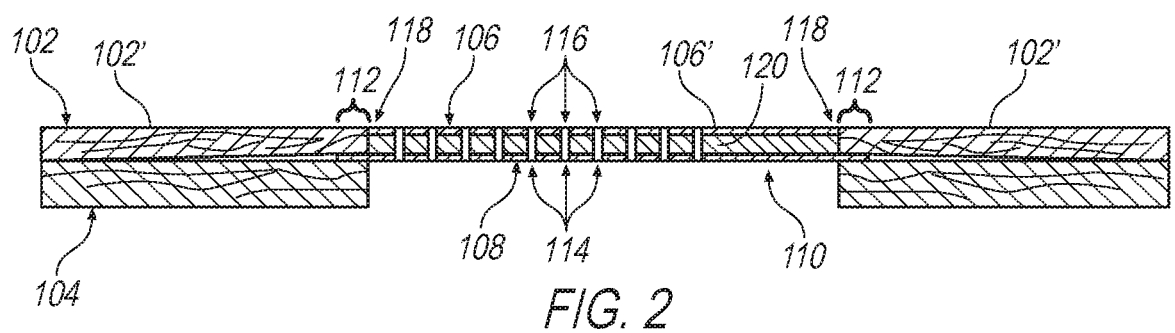
FIG. 2 is a section view of the floor vent assembly of FIGS. 1A and 1B, with the vent cover installed in an open orientation, according to one example.

Turning now to FIGS. 1A, 1B, and 2, an example vent cover assembly 100a is illustrated and described in further detail in connection with a floating floor. More specifically, a floating floor 102 is generally overlaid upon a subfloor 104 (FIGS. 1A and 1B are vertically exploded views, and thus floor 102 is shown spaced vertically away from the subfloor 104 in those examples). The floating floor 102, however, is not directly secured to the subfloor 104, e.g., by nails or other mechanical fasteners, glue, or the like, and thus is decoupled from the subfloor 104 (hence the "floating" nomenclature). Moreover, while the floating floor 102 is generally stationary upon the subfloor 104, the floating floor 102 may be spaced from associated walls of the room (not shown) by a relatively small space or gap to permit expansion/contraction of the floating floor 102, allow for manufacturing tolerances, etc.

The vent cover assembly 100a may include a support plate 108 and a vent cover 106. The vent cover assembly 100a may be installed over an HVAC duct opening 110 in the floating floor 102, which conducts heated or cooled air into a room associated with the floor 102 and subfloor 104. It should be understood that the disclosed assembly can be used with any number of different flooring systems and is not specifically limited to the floating floor system of FIGS. 1A, 1B, and 2.

The floor 102 may be formed of any flooring material that is convenient, such as laminate, engineered wood, solid wood, vinyl, cork, bamboo or any alternative material suitable for flooring. Furthermore, as will be described further below, the floor vent assembly 100a can be installed generally at the same time the floor 102 is installed (e.g., in a new construction application) or after the floor 102 is installed (i.e., as a replacement for an existing floor vent). While the flooring 102 is cut away in FIGS. 1A and 1B to better illustrate the structure of the vent assembly 100a, it may extend substantially over an entire subfloor 104, and may generally surround the vent cover 106. Flooring 102 in one example can be a rectangular piece of laminate wood flooring as illustrated, but it should be appreciated that flooring of any shape or configuration can also be used.

In the example illustrated in FIGS. 1A, 1B, and 2, an outermost perimeter 112 of the support plate 108 is sandwiched between the subfloor 104 and floor 102, and the main portion of the support plate 108 sits atop the opening to the vent. The vent cover 106 rests directly upon the support plate 108, and is of such a thickness as to allow it to lay flush with the surrounding floor. For example, as best seen in FIG. 2, an upper surface 106' of the vent cover 106 is generally parallel to and substantially continuous with a flooring upper surface 102'. Both the support plate 108 and vent cover 106 define airflow apertures 114 and 116, respectively, to allow for airflow from the vent opening 110 into the.

As best seen in FIGS. 1A, 1B, and 2, the support plate 108 is illustrated in a rectangular shape, however it should be noted that any shape convenient may be used. The support plate 108 may be relatively thinner than the floor 102 and subfloor 104, allowing it to fit between the subfloor 104 and floor 102 without creating a noticeable or significant difference in floor height around the vent cover assembly 100a. At the same time, the support plate 108 may be strong enough to support any reasonable weight or pressure that ordinary flooring would be expected to withstand. Moreover, the support plate 108 may be formed of any material that is flexible and can withstand the varying temperature of air that is expected to be released by an HVAC system. One example of a suitable material for the support plate is steel. In a further example, the support plate is formed of a 20-gauge stainless steel plate (1/32 inches thick). This thickness is also within generally accepted height variations for flooring. In other words, while the support plate 108 may cause a small relative vertical spacing between the subfloor 104 and floor 102 adjacent the vent cover 106 (best seen in FIG. 2), this relatively small spacing may be within generally accepted height variations for flooring systems.

Additionally, while the support plate 108 and the support plate outermost perimeter 112 are illustrated in FIGS. 1A, 1B, and 2 as being formed integrally together, the support plate 108 need not be a monolithic single piece. Merely by way of example, it is possible for the support plate 108 and the support plate outermost perimeter 112 to be made of differing materials. In some applications, for example, the support plate could be steel and the support plate outermost perimeter could be rubber or plastic. In another example, the support plate 108 may be formed of a generally single monolithic sheet steel, with the outer perimeter 112 being coated, e.g., with a rubber or plastic material, to facilitate installation of the support plate 108, inhibit corrosion, or the like.

The support plate 108, as illustrated in the example of FIGS. 1A, 1B, and 2, is generally larger than the vent opening 110, such that the support plate outermost perimeter 112 extends past the perimeter of the vent opening 110 by some distance, thereby supporting the support plate 108. The support plate outermost perimeter 112 should be sufficiently large enough that it will allow for the support plate 108 to be held in place while sandwiched between the floor 102 and subfloor 104, and for the remaining exposed portion of the support plate 108 to receive the vent cover 106.

The vent cover 106 comprises a plurality of vent cover air flow apertures 116 and in one example is able to be removably placed over the support plate 108. More specifically, the vent cover 106 may be overlaid upon the support plate 108, with the vent cover apertures 116 positioned above the corresponding support plate airflow apertures 114. The vent cover air flow apertures 116 span the depth of the vent cover 106, such that they extend from an uppermost surface 106', downward and through the vent cover 106. As illustrated, the support plate airflow apertures 114 and 116 may each be generally elongated or rectangular shaped. However, it should be noted that other shapes and configurations of the openings 114, 116 can be used. For example, instead of having two rows of apertures as illustrated in FIGS. 1A, 1B, and 2, there could be a single row of longer apertures that are longer. Moreover, while the apertures 114 in the support plate 108 are illustrated as having substantially identical size and shape as the apertures 116 of the vent cover 106, this is not required.

The vent cover 106 is of an appropriate size to fit over an exposed portion of the support plate 108 and fill any gaps in the flooring 102 surrounding the vent cover 106. The vent cover 106 has a vent cover outermost perimeter 118 that is generally smaller than the support plate 108 and the support plate outer perimeter 112, as best seen in FIGS. 1A and 1B.

As mentioned above, in some examples the vent cover 106 is made out of the same material as the flooring 102 so as to blend in with the flooring and be unobtrusive. Any flooring material such as laminate, engineered wood, solid wood, vinyl, cork, bamboo or any alternative material suitable for flooring may be employed in connection with the vent cover 106 and/or flooring 102. Merely by way of example, the vent cover 106 and floor 102 are each illustrated as having a matching woodgrain appearance on the upper surfaces 106', 102' thereof, respectively.

As best seen in FIG. 2, the vent cover 106 may be trimmed down on a back side or underside thereof, to accommodate the depth of the vent opening, i.e., from the support plate 108 to the upper surface 102' of the floor 102, so that the vent cover 106 lays flush with the surrounding floor 102. When the support plate 108 is made of steel (or any other magnetically susceptible material), the vent cover 106 may have a magnetic material layer 120 applied to a backside or underside of the vent cover 106, so as to help with maintaining the installed position of the vent cover 106 upon the support plate 108. The magnetic material layer 120 may cover a portion of or the entire underside surface of the vent cover 106 (as best seen in FIG. 2). Where the magnetic material layer 120 extends across the entire backside of the vent cover 106, the magnetic material layer 120 may also be cut with openings aligned to the vent cover airflow apertures 116 of the vent cover 106.

Figure 3A:
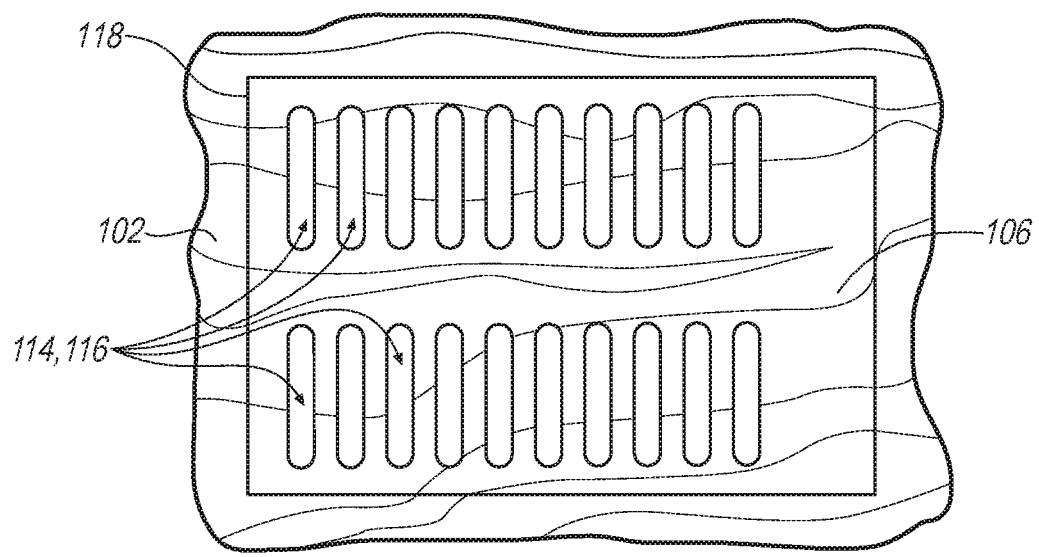
FIG. 3A is a top view of the vent cover assembly of FIGS. 1A, 1B, and 2 with the vent cover installed in an open orientation, according to an example approach.
Figure 3B:
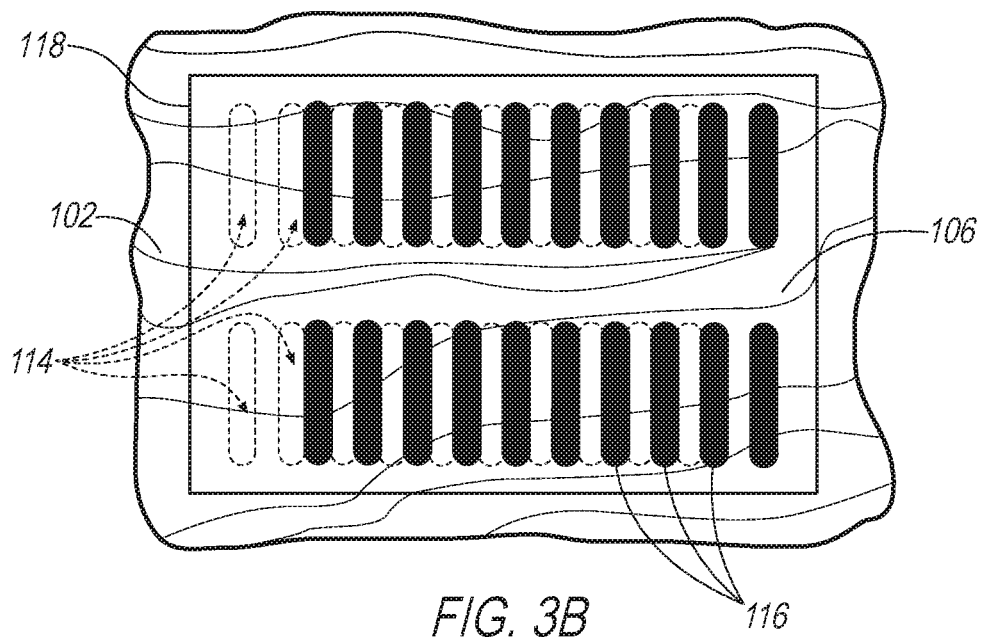
FIG. 3B is a top view of the vent cover assembly of FIGS. 1A, 1B, 2, and 3A with the vent cover installed in a closed or obstructed orientation, according to one example approach.

As mentioned above, in the example illustrated in FIGS. 1A, 1B, and 2, the airflow apertures 116 are defined by the vent cover 106 such that they are positioned asymmetrically lengthwise with respect to the vent cover outermost perimeter 118. The vent cover assembly 100a may thereby be opened and closed by simply lifting and rotating the vent cover 106. More specifically, as shown in FIGS. 1A, 2, and 3A, the vent cover 106 may be placed in a first position overlying the support plate 108. In the first position, the vent cover apertures 116 are aligned with the support plate apertures 114, such that airflow from the duct 110 through the vent cover assembly 100a is freely permitted. The vent cover assembly 100a may be closed by lifting the vent cover 106 from the support plate 108, rotating the vent cover 106 by 180 degrees, and replacing upon the support plate 108. As shown in FIGS. 1B and 3B, in this second position the vent cover apertures 116 are shifted with respect to the support plate apertures 114, such that the vent cover apertures 116 are no longer aligned vertically with respect to the support plate apertures 114. As such, the support plate 108 partially or entirely blocks the vent cover apertures 116, and airflow through the support plate apertures 114 is inhibited or blocked entirely. It should be noted that any degree of asymmetry of the vent cover apertures 116 may be employed that is convenient. In the drawings, particularly in FIGS. 3A and 3B, the asymmetry of the vent cover apertures 116 with respect to the outer perimeter 118 of the vent cover 106 is visually emphasized in order to more effectively illustrate the effect of the asymmetry. In practice, however, the vent cover apertures 116 need only be asymmetric with respect to the symmetrical outer perimeter 118 of the vent cover 106 to a relatively small degree. More specifically, the vent cover apertures 116 need only be asymmetric to a sufficient degree that allows sufficient shifting of the apertures 116 with respect to the support plate apertures 114 when the vent cover 106 is switched between the first and second installed positions overlying the support plate 108.

The provision of a magnetic material layer 120 on the backside/underside of the vent cover 106 may enhance the degree to which the vent cover 106 blocks airflow through the support plate apertures 114, by ensuring the vent cover 106 remains positioned in direct contact with the support plate 108 despite a relatively increased air pressure in the duct opening 110 due to the operation of the HVAC system.

While the vent cover apertures 116 are illustrated in FIGS. 1B and 3B as entirely obstructing the support plate apertures 114 in the second/closed position, in other examples the apertures 114, 116 could be offset such that when rotated the support plate apertures 114 would be only partially blocked by the vent cover 106, so as to allow some air to enter the room but not as much as when the vent cover assembly 100a is fully open. Additionally, while the asymmetry of the vent cover apertures 116 is illustrated as being with respect to a length of the vent cover 106, it is possible to achieve the same results by placing the airflow apertures of the vent cover asymmetrically with respect to the width (i.e., shorter dimension) of the vent cover. Accordingly, any asymmetrical arrangement of the apertures 116 with respect to a symmetric outer perimeter 118 of the vent cover 106 may be employed that is convenient. Moreover, while the symmetrical vent cover outer perimeter 118 of the vent cover 106 is illustrated herein with a generally rectangular shape typical of vent registers, any other shape may be employed that is convenient.

The vent cover assembly 100a may be installed at the time of installation of the floor 102, or as a replacement to an existing vent/register in the floor 102. When installed at the same time as floor 102, some or all of the material used to form the vent cover 106 may be cut directly from the floor 102, thereby providing the opening in the floor 102 for the duct 110. The support plate 108 may be positioned upon the duct 110, and the floor 102 overlaid upon the subfloor 104, thereby retaining the support plate 108 against the subfloor 104. Conveniently, where the installation is being made into a floating floor system, e.g., such as with floor 102, the location of a hole cut for the vent is not as essential as the dimension of the hole, as the entire floor 102 is decoupled from the subfloor 104 (i.e., "floating") and is not fixed to the subfloor 104. Examples for providing an appropriate hole in the floor 102 will be discussed further below.

Figure 4:
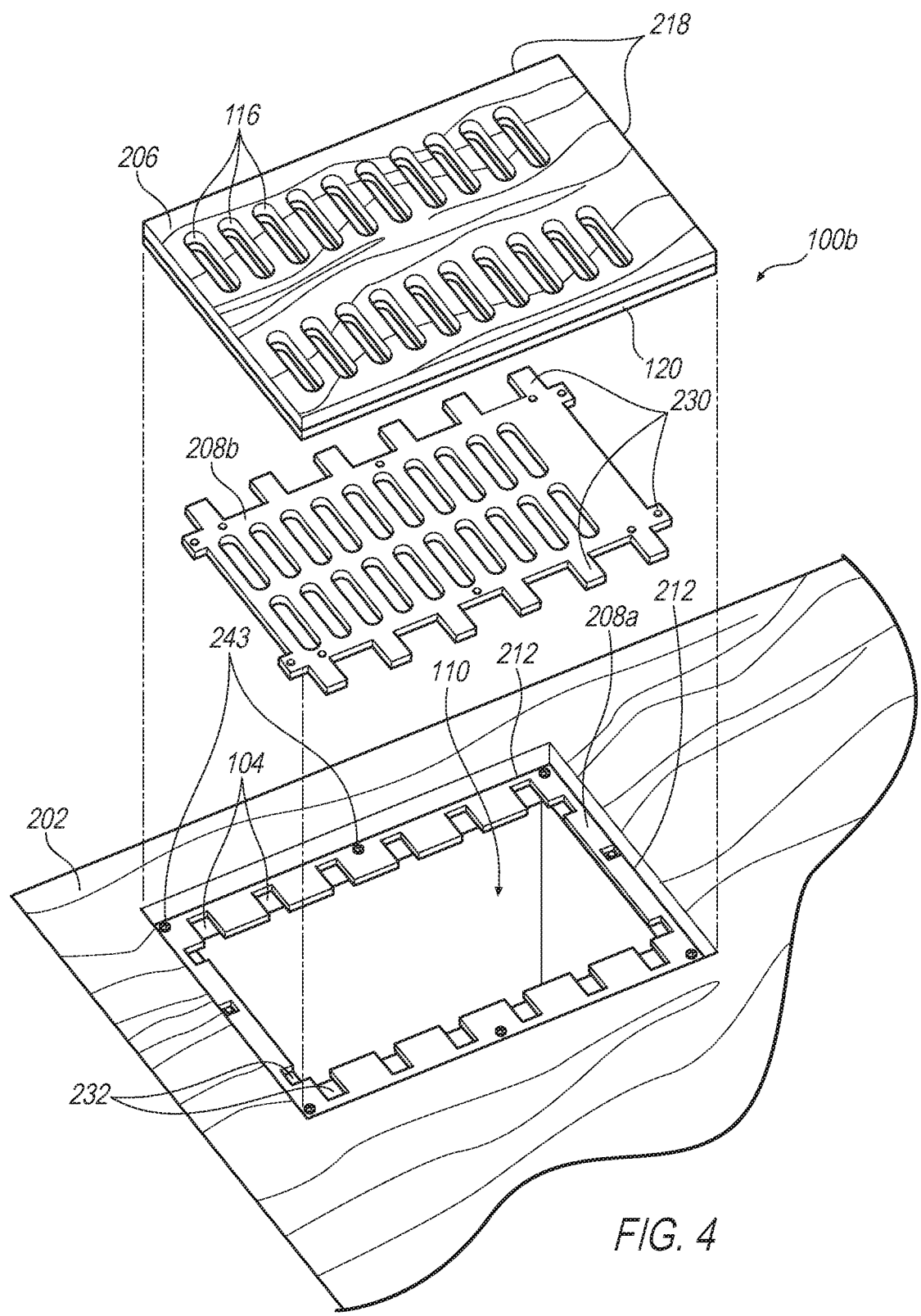
FIG. 4 is an exploded perspective view of another vent cover assembly having a support frame secured to a subfloor, according to one example illustration.
Figure 5:
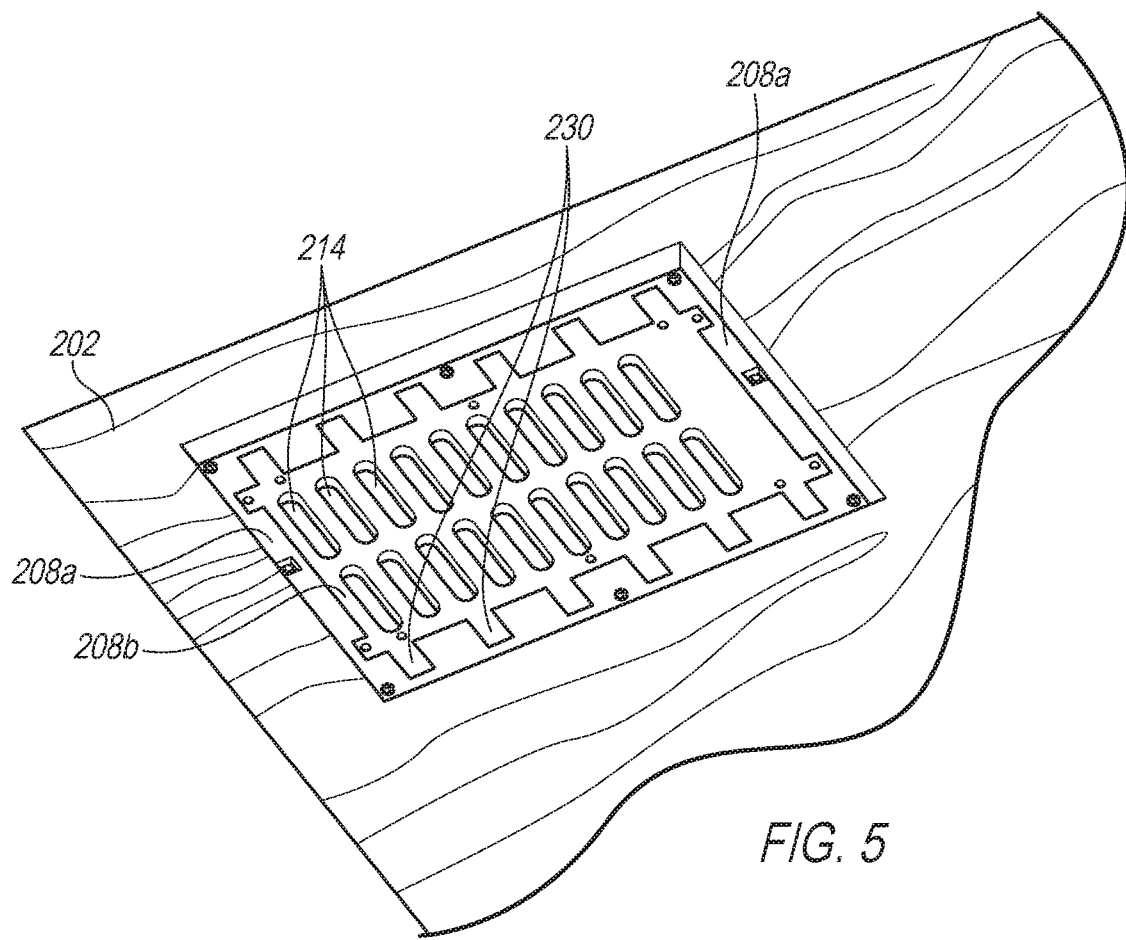
FIG. 5 is a perspective view of the vent cover assembly of FIG. 5, with a support plate installed within the support frame, according to one example illustration.

Turning now to FIGS. 4 and 5, another example vent cover assembly 100b is illustrated. The vent cover assembly 100b includes a vent cover 206 having vent cover apertures 116 which are selectively aligned with and offset with respect to support plate apertures 114. Accordingly, repositioning of the vent cover 206 in the first and second positions, and opening/closing of the vent cover assembly 100b in general is as described above in connection with vent cover assembly 100a.

The vent cover assembly 100b includes an outer frame 208a and support plate 208b, upon which the vent cover 206 is overlaid. The outer frame 208a is secured to subfloor 104 by one or more mechanical fasteners 243, e.g., screws or the like. The floor 202, in contrast to the floating floor 102 described above, may be a fixed flooring system, i.e., such that the floor 202 is secured to the subfloor 104 with nails, glue, or any other means that is convenient. A hole in the floor 202 may be cut such that the subfloor 104 is partially exposed, allowing the outer frame 208a to be directly fixed to the subfloor 104, as best seen in FIG. 4. The outer frame 208a may partially or entirely surround the support plate 208b, and generally provide a fixed position for the support plate 208b with respect to the subfloor 104 and floor 202. Additionally, while the outer frame 208a is generally secured to the subfloor 104 with the mechanical fasteners 243, the support plate 208b is selectively removable from the outer frame 208a, thereby permitting removal for access to the duct opening 110 beneath. The outer frame 208a defines a plurality of recess openings 232, which receive corresponding tabs 230 of the support plate 208b. Moreover, the tabs 230 may rest upon the portion of the subfloor 104 supporting the outer frame 208a, thereby vertically retaining the support plate 208b within the outer frame 208a.

In contrast to the relatively larger support plate 108 (which has an outer perimeter 112 extending beyond the outer perimeter 118 of the vent cover 106) illustrated in FIGS. 1A, 1B, and 2, the support plate/outer frame assembly 208a/208b may be relatively smaller. More specifically, as best seen in FIG. 4, the outer frame 208a and support plate 208b together may have a same width and length as the vent cover 206. A hole cut into the floor 202 may therefore be large enough to receive the outer frame 208a/support plate 208b, and the vent cover 206 overlying upon the outer frame 208a/support plate 208b.

Conveniently, the fixing of the outer frame 208a to the subfloor 104 allows the vent cover 206 to be installed some time after initial installation of the floor 202. In one example, upon installation of the fixed floor 202, a hole may be cut in the floor 202 corresponding to the location of the duct 110. Material removed from the floor 202 may, in some cases, be used to form the vent cover 206. Forming the vent cover 206 from the removed material may require offsite processing, e.g., cutting of the vent cover apertures 116, thinning of the vent cover 206 to allow addition of magnetic material layer 120, etc. During the time this offsite processing or manufacturing occurs, the support plate 208b and outer frame 208a may remain installed, since the outer frame 208a is fixed in place with respect to the subfloor 104, as is the surrounding floor 202. The fixing of the outer frame 208a may advantageously allow installation of flush mount vent cover assembly 100b to be completed some time after the fixed floor 202 is installed (e.g., sufficient to allow offsite processing/manufacturing of the vent cover 206). As such, it is not required to install the vent cover assembly 100b at the time of installation of the surrounding fixed floor 202. The fixed floor 202, in contrast to a floating floor such as floor 102, generally must be accurately positioned with respect to the vent 110 (due to the need to generally fix the lateral position of the fixed floor 202 with respect to the subfloor 104), and the outer frame 208a may hold that position (and space for the vent cover 206) properly by being fixed to the subfloor 104.

Accordingly, in both the floating floor 102 (illustrated in FIGS. 1A, 1B, and 2) and fixed floor 202 (illustrated in FIGS. 4 and 5) examples, a vent cover assembly 100a, 100b may be installed at the time of installation of the floor 102/202, or as a replacement to an existing vent/register in the floor 102/202, respectively. In examples where the vent cover assembly 100a, 100b is being installed as a replacement for an existing vent or register, or as an entirely new vent, an opening may be cut in floor 102, 202 in an appropriate location (i.e., corresponding to the position of the duct 110) using a frame or other template that defines an appropriate size/shape for the opening.

Figure 6A:
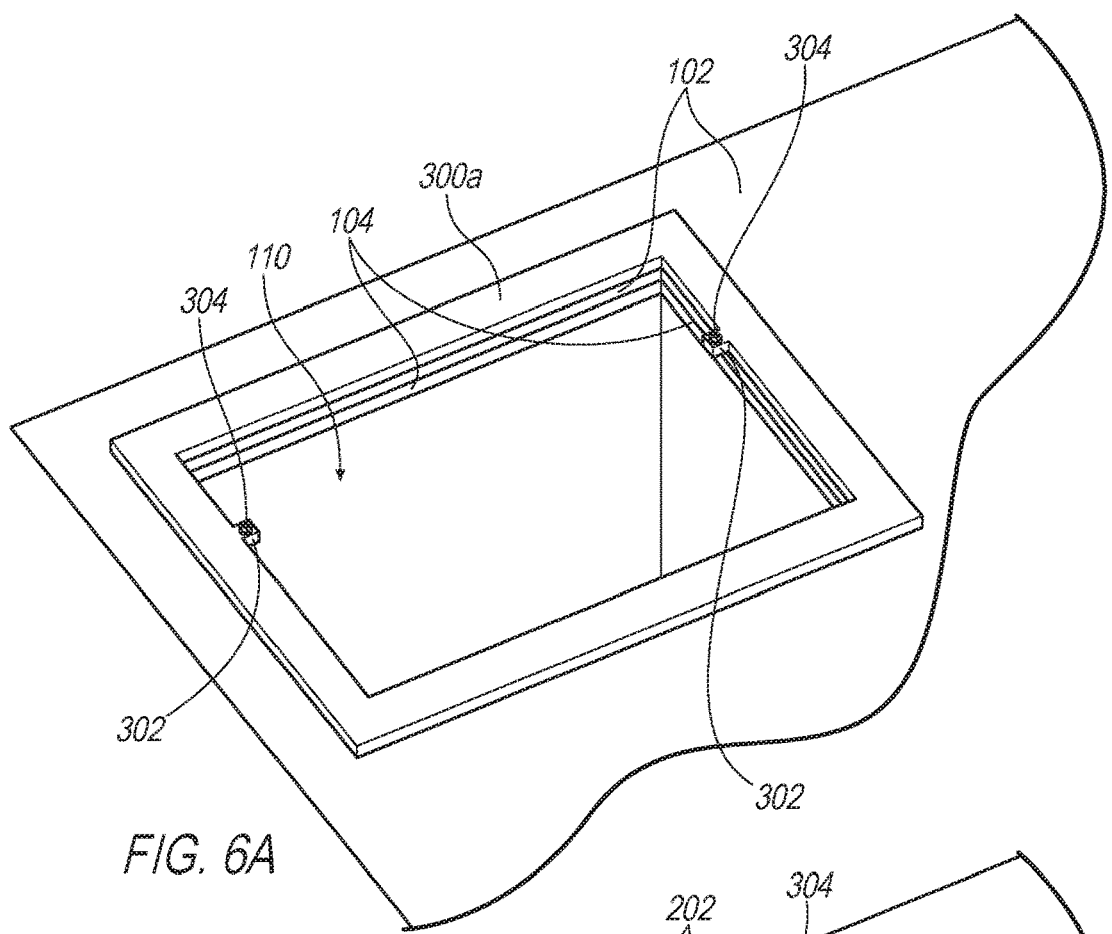
FIG. 6A is a perspective view of a template for establishing a vent aperture in a floor and/or subfloor, according to one example.
Figure 6B:
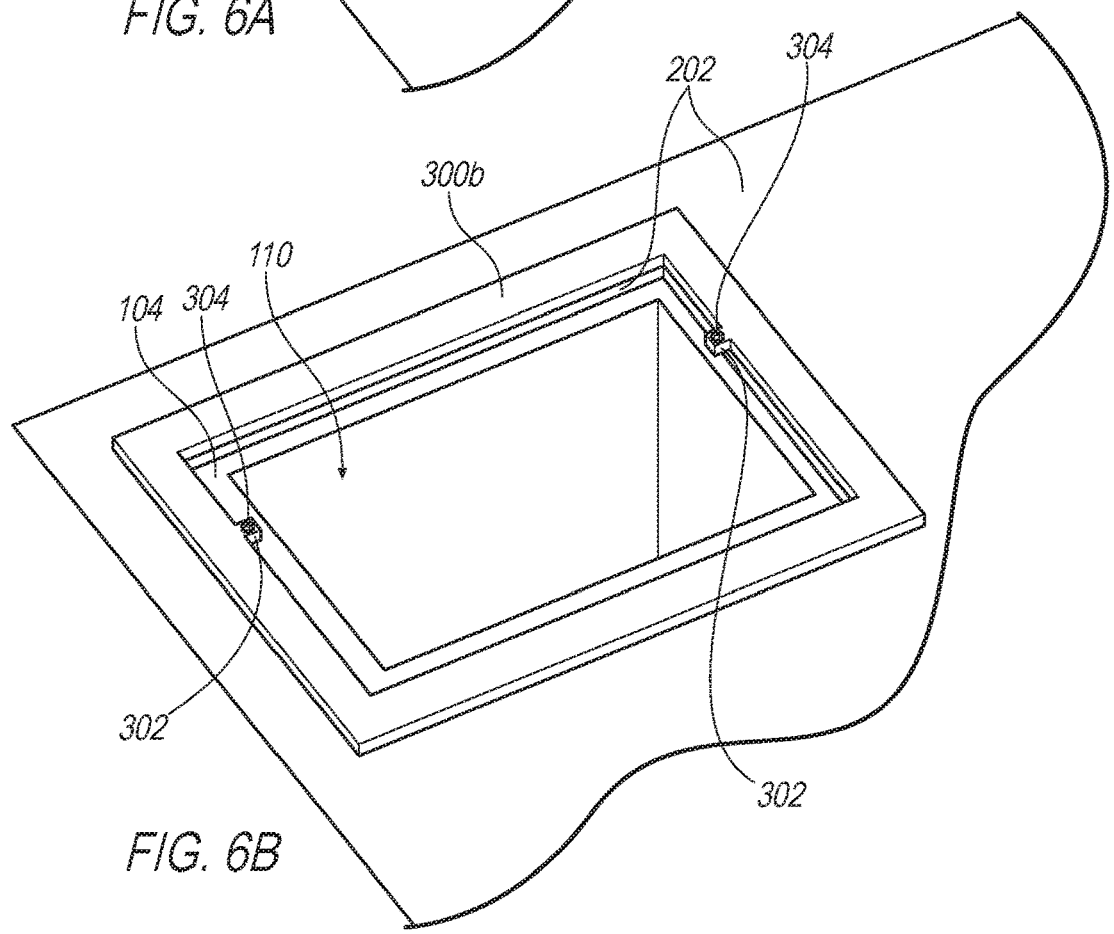
FIG. 6B is a perspective view of a template for establishing a vent aperture in a floor and/or subfloor, according to an exemplary approach.

Turning now to FIGS. 6A and 6B, examples of a template are illustrated, which may be used to form a hole or aperture in a floor 102, 202 for installing a flush mount vent cover assembly 100a, 100b.

In FIG. 6A, a frame 300a is illustrated that may be used to form a hole in the floating floor 102 corresponding to the duct opening 110. A hole of similar or identical size may be formed in the subfloor 104 using the frame 300a. The frame 300a generally defines an interior dimension corresponding to the hole being formed in the floor 102 and subfloor 104. The frame 300a may be secured to the floor 102, e.g., by way of mechanical fasteners such as self-tapping screws 304 which are received in offset tabs 302. A saw, grinding tool, cutting tool, or the like may be used to cut away material from the floor 102 within the frame 300.

The frame 300a may be provided with an inside hole or dimension fractionally larger than the vent cover 106, such that the vent cover 106 may be dropped in upon the support plate 108 (not shown in FIG. 6A) after the hole is cut in the floor 102 and subfloor 104. The size and shape of the frame 300a will vary depending on the size of the vent cover 106 and flooring style. The frame 300a in one example is formed from a relatively thick steel plate, e.g., a 0.25-inch steel plate, however any material durable enough to maintain a rigid template for cutting the floor 102 may be employed.

In one example the template 300a may be secured to the flooring 102 using offset tabs 302. The tabs 302, as illustrated in FIG. 6A, may be offset toward one side of the frame 300a, although it is not required, so that the template may be flipped 180 degrees after a partial cutting of the floor 102 and/or subfloor 104 to allow for the remaining portion of the floor 102 and/or subfloor 104 initially covered by the tabs to be cut away. For example, the frame 300a may be secured to the floor 102, and the floor 102 and subfloor 104 cut around the inside perimeter of the frame 300a (using, merely as examples, a saw, grinder, or the like) excepting the areas of the floor 102 covered by the tabs 302. The frame 300a may then be removed, and the remaining material of the floor 102 disposed underneath the tabs 302 during initial cutting removed (without the assistance of the frame 300a). In another example approach, after initially attaching the frame 300a, cuts in the floor 102 and/or subfloor 104 can be made along the sides of the frame 300a adjacent the tabs 302. Then the frame 300a can be removed, flipped, and reattached to the floor 102 in the opposite position. When the cuts are made all the way around the remaining portion of the frame 300a, the entire piece to be removed from the floor 102 will be free. In still another example, the frame 300a may be secured and cuts made around the entirety of the frame 300a. The frame 300a may be subsequently flipped, and a fastener may be used to secure the frame 300a to the subfloor 104, thus firmly adhering the template over the hole. Given the depth of the subfloor 104 beneath the floor 102 with respect to the frame 300a, a relatively longer screw may be needed in order to secure the frame 300a to the subfloor 104.

Once the hole in the floating floor 102 is formed, support plate 108 may be slid into position between the subfloor 104 and floating floor 102. In the example illustrated in FIGS. 1A, 1B, and 2, the support plate 108 may be inserted with the shorter dimensioned end into the hole in the floor 102. The support plate 108 may be relatively thin and have some flexibility, as noted above, permitting the support plate 108 to be turned and wedged in between the subfloor 104 and floating floor 102. Once the support plate 108 is positioned, the vent cover 106 may be overlaid upon the support plate 108.

Turning now to FIG. 6B, frame 300b may be used in similar fashion to form a hole in fixed floor 202 as frame 300a is described above with respect to floating floor 102. As shown in FIG. 6B, frame 300b may be used to form a hole in the floor 202 corresponding to the duct opening 110. The frame 300b generally defines an interior dimension corresponding to the hole being formed in the fixed floor 202. Additionally, the frame 300b may be secured to the floor 202, e.g., by way of mechanical fasteners such as self-tapping screws 304 which are received in tabs 302. It should be noted that the frame 300b is used in generally identical fashion on the fixed floor 202 as frame 300a is used on floating floor 102, apart from dimensional differences resulting from the differences outlined above regarding floating floor 102 and fixed floor 202 applications. For example, in the examples illustrated above for a fixed floor 202 in FIGS. 4 and 5, the subfloor 104 may be exposed around the perimeter of the duct 110 in order to support the outer frame 208a and allow securing the outer frame 208a to the subfloor 104. Accordingly, the floor 202 and subfloor 104 may be cut in separate stages, or using different templates or frames.

Figure 7:
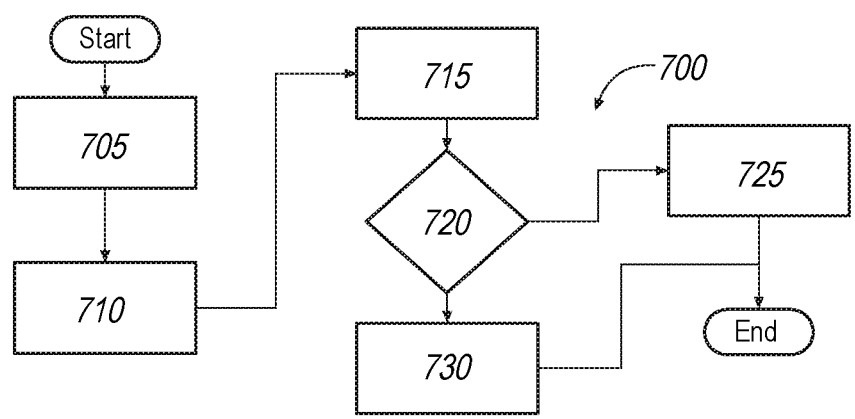
FIG. 7 is a process flow diagram for an example method of providing a floor vent assembly.

Turning now to FIG. 7, example methods associated with vent cover assemblies 100a, 100b, e.g., for installing vent cover assemblies 100a, 100b, are discussed in further detail. Process 700 may begin at block 705, where a vent aperture or hole is formed in a floor. For example, as discussed above, where a hole in existing flooring is being cut to allow installation of the vent cover assembly, a frame or template, e.g., frame 300a or 300b, may be affixed temporarily to the floor to guide the cutting/grinding process. Process 700 may then proceed to block 710.

At block 710, a support plate may be positioned adjacent a vent aperture defined by a flooring. For example, as described above, support plate 108 or outer frame 208a and support plate 208b, may be positioned atop a duct opening 110. As noted above, the support plates 108, 208b define a plurality of first airflow apertures 114 configured to permit airflow from a duct through the support plate 108, 208b. Moreover, support plates 108, 208b may be installed in any manner convenient. For example, in a floating floor application, e.g., such as floor 102, support plate 108 may be slid in between subfloor 104 and floor 102. Alternatively, in a fixed floor application, outer frame 208a may be secured to a portion of the subfloor 104, with the support plate 208b supported upon the subfloor 104 by way of tabs 230 of the support plate 208b, as described above.

Proceeding to block 715, the support plate may be overlaid with a flush mount vent cover having an upper surface configured to extend substantially continuous with an adjacent floor surface when installed overlying the support plate. For example, as described above, a vent cover 106, 206 may be overlaid upon a support plate 108, or outer frame 208a and support plate 208b, respectively. Moreover, the vent covers 106, 206 each define an upper surface extending parallel to, and substantially continuous with, that of surrounding floor 102, 202, as noted above. The vent cover 106, 206 may define a second plurality of airflow apertures 116. Moreover, the vent cover apertures 116 may be positioned in the vent cover 106, 206 such that the second plurality of airflow apertures are aligned with the first airflow apertures 114 of the support plate 108, 208b when the vent cover is in a first installed position overlying the support plate, and the vent cover obstructs the first airflow apertures 114 when the vent cover is in a second installed position overlying the support plate.

As also discussed above, in some example approaches, the vent cover 106, 206 may be formed of a same material as a surrounding flooring 102, 202 defining at least in part the vent aperture or duct opening 110. Additionally, in some examples the second plurality of airflow apertures 116 may be positioned asymmetrically with respect to a vent cover outermost perimeter or outer symmetrical shape defined by the vent cover 106, 206. The vent cover 106, 206 may be configured to be placed into a second installed position from the first installed position by removing, rotating the vent cover 180 degrees, and replacing the vent cover 106, 206 upon the support plate 108, 208b. Process 700 may then proceed to block 720.

At block 720, process 700 may query whether vent cover assembly is being installed into a floating floor or non-floating floor application. Where a floating floor, e.g., floor 102, is being employed, process 700 may proceed to block 725. Alternatively, if a fixed floor application is used, e.g., floor 202, process 700 may proceed to block 730.

At block 725, in a floating floor application the support plate 108 may define a support plate outermost perimeter 112 configured to be installed against or adjacent an underside of the floating floor 102 defining the adjacent floor surface 102'. Moreover, in such applications the vent cover 106 may define a vent cover outermost perimeter 118 disposed within, or otherwise smaller than, the support plate outer perimeter 112.

At block 730, if a vent cover assembly is being installed into a fixed floor application, at least a portion of the support plate may be surrounded with a support plate frame, e.g., outer frame 208a. As noted above, in fixed floor applications a support plate 208b may be held in position by way of an outer frame 208a that is secured to the subfloor 104. Moreover, the support plate 208b may be selectively removable from the outer frame 208a while the support plate frame 208a is secured to the subfloor, at least in a semi-permanent manner. For example, as described above an outer frame 208a may be secured to subfloor 104 by screws or other fasteners, thereby allowing the outer frame 208a to maintain a position upon the subfloor 104 with respect to the fixed floor 202.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A vent cover assembly, comprising:
   a support plate configured to be positioned extending across a vent aperture defined at least in part by an outer surface, the support plate having an outer perimeter configured to be positioned underneath the outer surface with the support plate extending across the vent aperture; and
   a flush mount vent cover configured to be installed overlying the support plate, the vent cover having an upper surface configured to extend substantially continuous with the outer surface when installed overlying the support plate such that the upper surface of the flush mount vent cover is in contact with and parallel to the outer surface along multiple sides of the vent cover, thereby preventing rotation and translation of the flush mount vent cover relative to the outer surface while the vent cover is installed overlying the support plate;
   wherein the support plate defines a first plurality of airflow apertures and the vent cover defines a second plurality of airflow aperture, the first of airflow apertures and the second plurality of airflow apertures configured to selectively permit airflow through the support plate and the vent cover when the vent cover is installed overlying the support plate, wherein airflow through the support plate and the vent cover is restricted by removing the vent cover from the support plate and reinstalling the vent cover overlying the support plate with the second plurality of airflow apertures shifted relative to the first plurality of airflow apertures.

2. The vent cover assembly of claim 1, wherein the vent cover defines a same thickness with respect to the support plate as a material layer defining the outer surface along the multiple sides of the vent cover.

3. The vent cover assembly of claim 1, wherein the support plate positions the upper surface of the vent cover flush with respect to the outer surface, such that the upper surface and outer surface do not protrude with respect to each other.

4. The vent cover assembly of claim 1, wherein the upper surface of the flush mount vent cover is in contact with and parallel to the outer surface about an entire perimeter of the vent cover.

5. The vent cover assembly of claim 1, wherein the second plurality of airflow apertures are configured to be positioned with respect to the first airflow apertures in a first relative position when the vent cover is overlying the support plate such that airflow is permitted through the support plate and the vent cover via the first and second airflow apertures, and wherein the second plurality of airflow apertures are shifted with respect to the first airflow apertures and the vent cover at least partially obstructs the first airflow apertures in a second relative position when the vent cover is overlying the support plate, such that airflow through the support plate and vent cover via the first and second airflow apertures is relatively restricted.

6. The vent cover assembly of claim 1, wherein airflow through the support plate and vent cover is restricted by rotating the vent cover.

7. The vent cover assembly of claim 5, wherein the support plate is in a same stationary position over a duct when the second plurality of airflow apertures of the vent cover are in the first relative position and when the second plurality of airflow apertures of the vent cover are in the second relative position.

8. The vent cover assembly of claim 5, wherein the second plurality of apertures in the flush mount vent cover are shifted with respect to the outer surface when the second plurality of airflow apertures of the vent cover are shifted with respect to the first plurality of airflow apertures from the first relative position to the second relative position.

9. The vent cover assembly of claim 1, wherein the first plurality of airflow apertures are entirely obstructed by the vent cover when the vent cover is reinstalled overlying the support plate with the second plurality of airflow apertures shifted relative to the first plurality of airflow apertures.

10. The vent cover assembly of claim 5, wherein the first plurality of airflow apertures are aligned with the second plurality of airflow apertures when the second plurality of airflow apertures of the vent cover are in the first relative position such that airflow through the first plurality of airflow apertures is freely permitted.

11. The vent cover assembly of claim 1, wherein the support plate is configured to be secured in a stationary position over a duct.

12. The vent cover assembly of claim 1, wherein the second plurality of airflow apertures are positioned asymmetrically in the vent cover where the second plurality of airflow apertures meet a bottom surface of the vent cover, the asymmetric position of the second plurality of airflow apertures being with respect to a vent cover outermost perimeter defined by the vent cover.

13. The vent cover assembly of claim 1, wherein the vent cover assembly is a floor vent cover assembly, and the outer surface is a floor surface.

14. The vent cover of claim 1, wherein the vent cover is elongated in a first direction, wherein the second plurality of airflow apertures are shiftable relative to the first plurality of airflow apertures in the first direction.

15. The vent cover of claim 1, wherein the support plate is configured to be in contact with an underside of the outer surface when the support plate is positioned extending across the vent aperture.

16. The vent cover of claim 1, wherein the support plate is configured to be slid in between an underside of the outer surface and a subfloor.

17. A vent cover assembly, comprising:
   a support plate configured to be positioned extending across a vent aperture defined at least in part by a floor surface, the support plate having an outer perimeter configured to be positioned underneath the floor surface with the support plate extending across the vent aperture; and
   a flush mount vent cover configured to be installed overlying the support plate, the vent cover having an upper surface configured to extend substantially continuous with the floor surface when installed overlying the support plate such that the upper surface of the flush mount vent cover is in contact with and parallel to the floor surface along multiple sides of the vent cover, thereby preventing rotation and translation of the flush mount vent cover relative to the floor surface while the vent cover is installed overlying the support plate;

wherein the support plate and vent cover define airflow apertures that are configured to selectively permit airflow through the support plate and the vent cover when the vent cover is installed overlying the support plate, wherein airflow through the support plate and the vent cover is restricted by removing the vent cover from the support plate and reinstalling the vent cover overlying the support plate with a second plurality of the airflow apertures defined by the vent cover shifted relative to a first plurality of the airflow apertures defined by the support plate.

18. The vent cover assembly of claim 17, wherein the vent cover defines a same thickness with respect to the support plate as a floor layer defining the floor surface along the multiple sides of the vent cover.

19. The vent cover assembly of claim 17, wherein the support plate positions the upper surface of the vent cover flush with respect to the floor surface, such that the upper surface and floor surface do not protrude with respect to each other.

20. The vent cover assembly of claim 17, wherein the upper surface of the flush mount vent cover is in contact with and parallel to the floor surface about an entire perimeter of the vent cover.

21. A method of installing a vent cover assembly having a support plate and a flush mount vent cover, the method comprising:

positioning the support plate underneath an outer surface defining a vent aperture, the support plate extending across the vent aperture and having an outer perimeter positioned underneath the outer surface; and overlying the support plate with the flush mount vent cover, the vent cover having an upper surface configured to extend substantially continuous with the outer surface when installed overlying the support plate such that the upper surface of the flush mount vent cover is in contact with and parallel to the outer surface along multiple sides of the vent cover, thereby preventing rotation and translation of the flush mount vent cover relative to the outer surface while the vent cover is installed overlying the support plate;

wherein the support plate and the vent cover define airflow apertures that are configured to selectively permit airflow through the support plate and vent cover when the vent cover is installed overlying the support slate, wherein airflow through the support plate and the vent cover is restricted by removing the vent cover from the support plate and reinstalling the vent cover overlying the support plate with a second plurality of the airflow apertures defined by the vent cover shifted relative to a first plurality of the airflow apertures defined by the support plate.

22. The method of claim 21, further comprising forming the vent aperture in a material layer defining the outer surface.

* * * * *